United States

[11] 3,626,399

[72] Inventor Lloyd T. Akeley
Fullerton, Calif.
[21] Appl. No. 867,053
[22] Filed Oct. 16, 1969
[45] Patented Dec. 7, 1971
[73] Assignee Simmonds Precision Products, Inc.
Tarrytown, N.Y.
Continuation-in-part of application Ser. No.
715,863, Mar. 25, 1968, now abandoned.
This application Oct. 16, 1969, Ser. No.
867,053

[54] INDICATOR AND CONTROLLER CIRCUIT FOR LIQUID LEVEL CONTROL
9 Claims, 2 Drawing Figs.
[52] U.S. Cl..................................................... 340/244
[51] Int. Cl................................................... G08b 21/00
[50] Field of Search............................................. 340/244,
244 C, 244 A, 227, 244 B, 59; 73/304

[56] References Cited
UNITED STATES PATENTS
3,334,339   8/1967   McCauley.................... 340/244 B
3,343,152   9/1967   Hart............................ 340/244 C
3,454,925   7/1969   Ruof............................ 340/227

Primary Examiner—John W. Caldwell
Assistant Examiner—Howard Cohen
Attorney—Edwin E. Greigg ABSTRACT: An indicator controller circuit for liquid containers having a liquid level responsive signaling device in which a two-stage amplifier having a unity voltage gain characteristic develops a current output from a transmitter voltage input. Connected to the output of the amplifier are two complementary Schmitt trigger circuits, one operating a high-alarm relay, the other operating a low-alarm relay for respective different levels of liquid sensed within the container.

PATENTED DEC 7 1971

3,626,399

INVENTORS
LLOYD AKELEY

BY *Edwin E. Greigg*

ATTORNEY

INDICATOR AND CONTROLLER CIRCUIT FOR LIQUID LEVEL CONTROL

This is a continuation-in-part application of application Ser. No. 715,863, filed Mar. 25, 1968, now abandoned.

This invention relates to liquid level control and, more particularly, to a solid state system for providing a continuous readout level indication, both local and remote, as well as an alarm and control circuit operable at any two independent points over the entire indicated range.

In liquid containers, whether closed or open, it is desirable to control various conditions which might affect the liquid content of such containers. For example, detection of an upper and lower limit is desirable for the purpose of controlling such parameters as volume, pressure, stress, temperature, etc. It is necessary, therefore, to provide a system which will give a warning in response to given quantities of liquid within the container and at the same time initiate a sequence of control steps to reestablish a desired state of conditions with respect to the quantity of liquid in the container. For example, a multistep operation would first give a warning for a given liquid quantity condition within the container. If this condition prevails, a second step would be initiated for slowing down or speeding up a process, for example, temperature, rate of feed, etc., and, thirdly, an emergency step might be initiated for giving an alarm and shutting down the operation of the control mechanism. It is the purpose of this invention to implement an alarm and control system for achieving the above-described operation.

Accordingly, it is an object of this invention to provide a liquid level alarm and control system utilizing reliable solid state circuitry for detecting upper and lower limits in the quantity of liquid in a container.

It is another object of this invention to provide a liquid level control system which may be made to operate as a single step or multistep system for effecting warning of high and low liquid levels within a container.

It is another object of this invention to provide a liquid level alarm and control system utilizing solid state circuitry which provides a fail-safe operation for effecting a control operation once a high or a low condition of liquid level is sensed.

It is still another object of this invention to provide a liquid level alarm and control system which provides a current output for indicating, recording and controlling functions and in which remote indication as well as local indication can be effected.

According to one aspect utilizing the principles of this invention, there is provide a circuit in which a transmitter energizing voltage responsive to liquid level in a container is fed to a two-stage complementary emitter-follower amplifier. A current output is obtained directly from the voltage input signal and this output controls two complementary Schmitt circuits connected in parallel and each operating a high and low alarm signal, respectively.

Other objects and advantages will be realized from a study of the following specification and drawing, in which.

Figure 1:
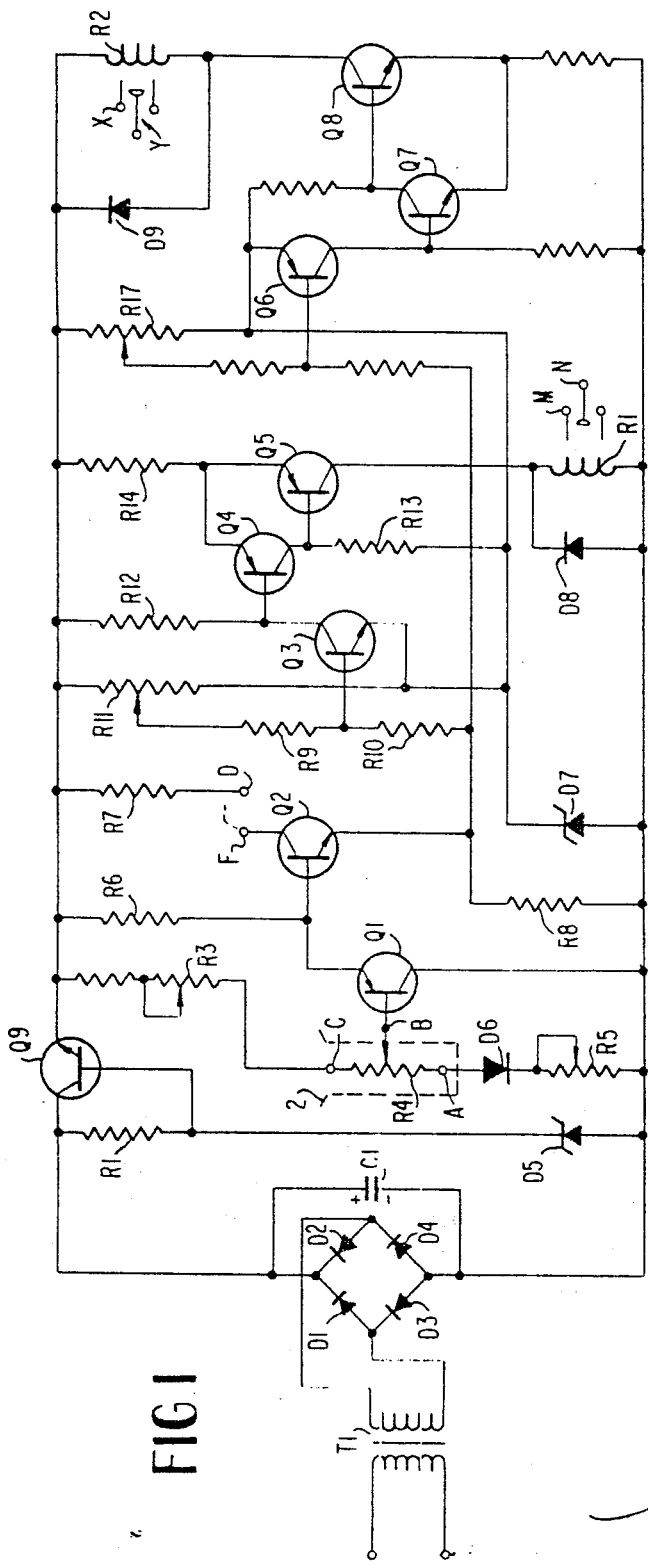
FIG. 1 is a circuit diagram illustrating the principles of this invention.

Referring now to FIG. 1, there is shown a transformer T1 having a 115 volt, 60 cycle supply. By means of a rectifier circuit D1, D2, D3, D4 and a capacitor C1, the alternating supply is converted to a DC voltage. A Zener diode D5 with resistor R1 and transistor Q9 provides a regulated DC voltage to excite a transmitter potentiometer R4. The potentiometer-type transmitter R4 may be generally of the float-operated type, such as described in application Ser. No. 715,863. The voltage output from the potentiometer R4 will then vary with the rise or fall of the liquid level in the tank 2, shown in dotted lines. The transmitter energizing voltage can be adjusted at the high and low ends of the transmitter, that is, the positive and negative sides, by the potentiometers R3 and R5, as shown, in order to provide span and zero adjustment. The output of the transmitter R4 at B is fed into a two-stage complementary emitter-follower amplifier Q1 and Q2 with the emitter resistance R8 of the second stage being set such that a current of 10 to 50 milliamps, for example, will develop a voltage of 1 to 5 volts. Since the amplifier is a unit voltage gain device, a current output of 10 to 50 milliamps is obtained directly from a 1 to 5 volt input signal. Thus, the voltage at the Q2 emitter is approximately equal to the voltage at the Q1 base.

A zener diode D7 is connected in series with a potentiometer R11 such that approximately one-half the total voltage (V/2) is across the potentiometer and the other half across the Zener diode. The output of the potentiometer is connected by means of a resistor R9 to the base of a common emitter-connected transistor amplifier Q3, the emitter of which is connected to the V/2 reference level. The voltage developed across resistor R8, which is proportional to transmitter input and current output I, is also fed by means of the resistor R10 to the base of transistor Q3. The base of Q3, then, sees the sum of the two voltages. The voltage appearing at the collector of Q3, which is an NPN-transistor, is fed to the base of Q4, which is a PNP-transistor, which, in turn, controls Q5, a PNP-transistor. If the voltage appearing at the base of Q3 is greater than approximately V/2 plus 0.6 volts, for example, Q3 then conducts and Q4 will conduct but Q5 will remain off. The relay R1 will remain deenergized and thus the low alarm will not be activated.

As the liquid level falls in the tank 2 and the transmitter voltage at B is reduced, current output I falls and the summed voltage at the base of transistor Q3 falls until it turns off. Transistor Q4 then turns off and transistor Q5 turns on to energize the relay R1 and hence activate the low alarm by closing the contacts MN, as shown. The level at which the lower alarm occurs is controlled by the setting of the potentiometer R11. As the voltage swing across this potentiometer is greater than the output of Q2, that is, 1 to 5 volts, the low alarm can be set to operate anywhere from empty to full. The high alarm with transistors Q6, Q7 and Q8, as well as potentiometer R17 operates in a similar manner to the circuit previously described for the low alarm, except that these transistors are complementary to Q3, Q4 and Q5, respectively, and therefore they operate on a rising voltage. The high alarm is also operable over the complete range from full to empty.

The diode D6 in series with the potentiometer transmitter R4 provides a temperature compensation in addition to that realized by the complementary nature of Q1, Q2 emitter-followers.

Figure 1A:
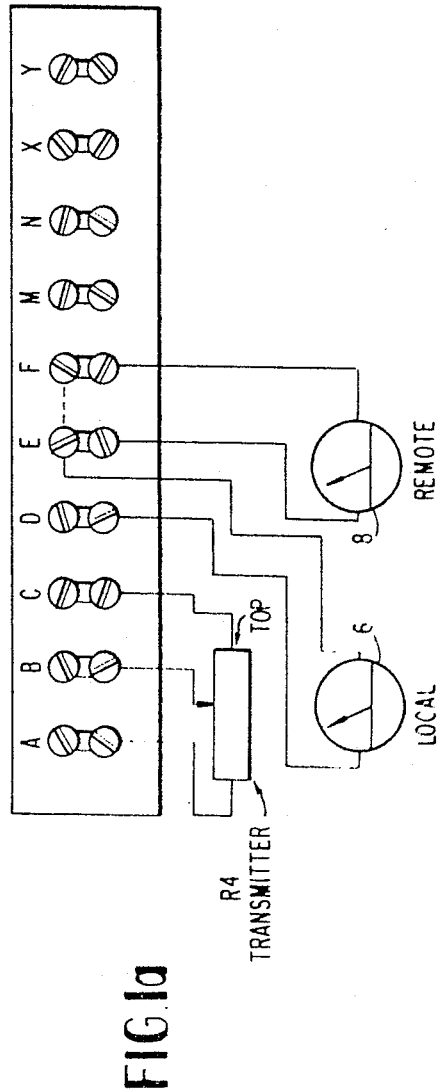
FIG. 1a is a schematic showing the terminal board for the circuit shown in FIG. 1.

As shown in FIG. 1a, a terminal board 4 is provided with a series of terminal connections A, B, C, D, E, etc., and as shown the R4 transmitter potentiometer is connected to terminals A, B and C, a local indicator 6 is connected to terminals D and E, and a remote indicator 8 is connected to terminals E and F. As previously described, the low alarm and high alarm relays operate from switching transistors Q5 and Q8, respectively, to provide isolated alarm or control contacts which can control AC or DC loads. The relays can be omitted and limited wattage DC alarms can be controlled directly from switching transistors Q5 and Q8 to provide solid state switching. Diodes D8 and D9 are provided, as shown, to protect transistors Q5 and Q8 from peak voltages resulting from current interruption in the relays.

Since current output I is independent of load up to several hundred ohms, several devices may be connected in series across terminals D to F to indicate, record and/or control from this current output. Further, the current loop resistance does not affect output and hence remote indication by great distances is practical. When maximum loads are used, resistor R7 may be shorted out, and when normal loads are used R7 may be utilized to reduce the wattage in Q2 and hence reduce self-heating effects. Resistor R8, which normally has a value of 100 ohms for a 10 to 50 milliamp output current, can be easily replaced by a different value of resistance if a different output current range is desired.

That which is claimed is:

1. In an alarm and control circuit for a liquid level voltage transmitter signaling device comprising means regulating a DC supply connected to said signaling device, an amplifier connected to said signaling device having complementary transistors for producing a current output, a pair of complementary trigger circuits connected in parallel, each of said circuits having a first transistor having its base connected to the output of said amplifier circuit and its emitter connected to a voltage reference level, a second transistor having its base connected to the collector of said first transistor, a third transistor having its base connected to the collector of said second transistor, and an alarm relay in the load circuit of said third transistor whereby said circuit is responsive to different predetermined levels of liquid within the container.

2. In a circuit according to claim 1, including indicator or recording means connected in series with the output of said amplifier, said amplifier having a voltage gain of approximately one.

3. In a circuit according to claim 1, including a voltage divider connected across said DC supply for establishing a voltage reference level, said divider comprising a Zener diode and a potentiometer having an adjustable arm adapted to be set for establishing the voltage which is summed to a voltage from the amplifier output and related for switching purposes to said voltage reference level, said amplifier having a voltage gain of approximately one.

4. An alarm and control circuit for a liquid container having a liquid level voltage transmitter signaling device comprising DC supply means connected to said signaling device and said circuit, an amplifier operatively connected to said signaling device and responsive thereto for producing a current output, a pair of complementary trigger circuits, each of said circuits having an input connected to the output of said amplifier and to a voltage reference level so as to operatively switch said trigger circuits in response to a predetermined level of liquid in the container, one of said trigger circuits adapted to respond to a low liquid level condition in the container, the other of said trigger circuits adapted to respond to a high liquid level condition, and separate alarm means connected to the output of each of said trigger circuits for providing an indication of the existence of a low or high condition.

5. A circuit according to claim 4 including indicator or recorder means operatively connected to the output of said amplifier, said amplifier having a voltage gain of approximately one.

6. A circuit according to claim 4 including for each trigger circuit a voltage divider connected across the DC supply means having an adjustable reference potentiometer for establishing the reference level, means for summing the output voltage from the amplifier and the reference level to control operation of said trigger circuits, and said amplifier having a voltage gain of approximately one.

7. An alarm and control circuit for a liquid container having a liquid level voltage transmitter signaling device comprising DC supply means connected to said signaling device, an amplifier connected to said signaling device having complementary transistors for producing a current output, a pair of complementary Schmitt trigger circuits connected in parallel, one arranged to operate a first alarm circuit indicative of a high liquid condition in the container, the other arranged to operate a second alarm circuit indicative of a low liquid condition in the container, means for establishing a voltage reference corresponding to the level of liquid in the container, each of said trigger circuits having a first transistor having its base connected to the output of said amplifier circuit and its emitter connected to the voltage reference, a second transistor having its base connected to the collector of said first transistor, a third transistor having its base connected to the collector of said second transistor, and alarm means in the load circuit of each of said third transistors whereby said circuit is responsive to predetermined high and low liquid levels in said container.

8. A circuit according to claim 7, including indicator or recorder means connected to the output of said amplifier.

9. A circuit according to claim 7 wherein said means for establishing a voltage reference includes a voltage divider connected across said DC supply to establish said voltage reference and having a Zener diode and an adjustable potentiometer, means for summing the voltage reference to independently control operation of said trigger circuits in response to the level of liquid in the container and said amplifier having a voltage gain of approximately one.

* * * * *